United States Patent [19]

Piesinger

[11] Patent Number: 4,583,191
[45] Date of Patent: Apr. 15, 1986

[54] SCAN CONVERTER

[75] Inventor: Gregory H. Piesinger, Scottsdale, Ariz.

[73] Assignee: Sperry Corporation, New York, N.Y.

[21] Appl. No.: 520,049

[22] Filed: Aug. 4, 1983

[51] Int. Cl.$^4$ .............................................. G06F 3/14
[52] U.S. Cl. .................................................. 364/731
[58] Field of Search ............... 364/731, 815, 521, 522; 343/5 SC; 340/727

[56] References Cited

U.S. PATENT DOCUMENTS

| | | | |
|---|---|---|---|
| 4,106,021 | 8/1978 | Katagi | 364/731 |
| 4,241,412 | 12/1980 | Swain | 343/5 SC |
| 4,477,802 | 10/1984 | Walter et al. | 340/727 |
| 4,484,192 | 11/1984 | Seitz et al. | 340/727 |
| 4,504,913 | 3/1985 | Miura et al. | 364/521 |
| 4,511,973 | 4/1985 | Miura et al. | 364/521 |
| 4,513,377 | 4/1985 | Hasebe et al. | 364/521 |

*Primary Examiner*—James D. Thomas
*Assistant Examiner*—Dale M. Shaw
*Attorney, Agent, or Firm*—Howard P. Terry; Seymour Levine

[57] ABSTRACT

A method and apparatus for entering data in a random access memory with a fixed orientation independent of the heading vector of the carrier vehicle. The data remains positionally fixed in the memory and is addressed for readout in a manner to present a heading-up display for all vehicle heading vectors.

9 Claims, 8 Drawing Figures

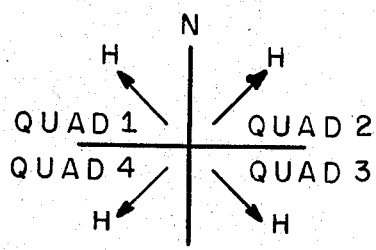

FIG. 3.

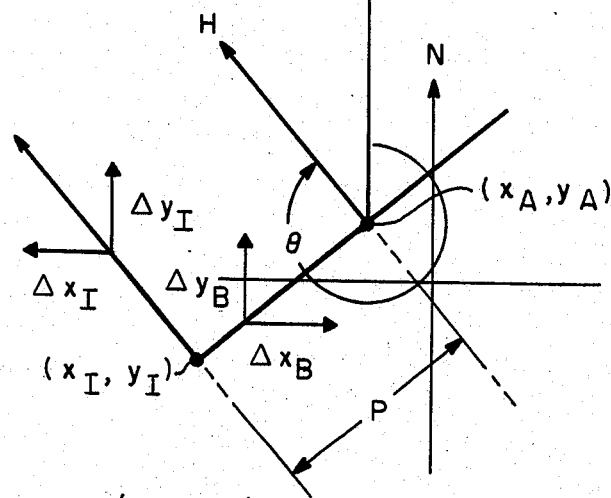

FIG. 3a.

$y_I = (x_I - x_A)\tan\theta + y_A$
$x_I = -P|\cos\theta| + x_A$
$\Delta y_I = \Delta R|\cos\theta|; \Delta x_I = -\Delta R|\sin\theta|$
$\Delta y_B = \Delta P|\sin\theta|; \Delta x_B = \Delta P|\cos\theta|$

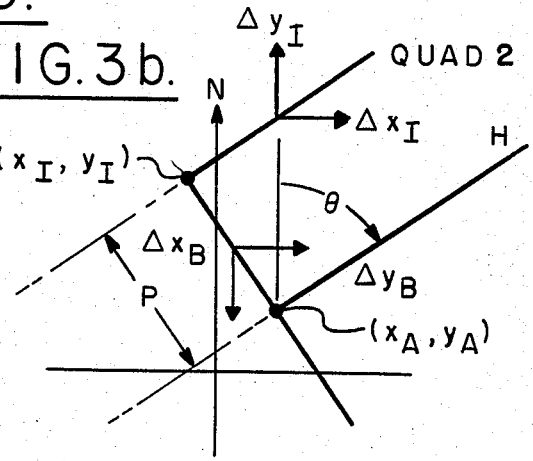

FIG. 3b.

$y_I = -(x_I - x_A)\tan\theta + y_A$
$x_I = x_A - P\cos\theta$
$\Delta y_I = \Delta R|\cos\theta|; \Delta x_I = \Delta R|\sin\theta|$
$\Delta y_B = -\Delta P|\sin\theta|; \Delta x_B = \Delta P|\cos\theta|$

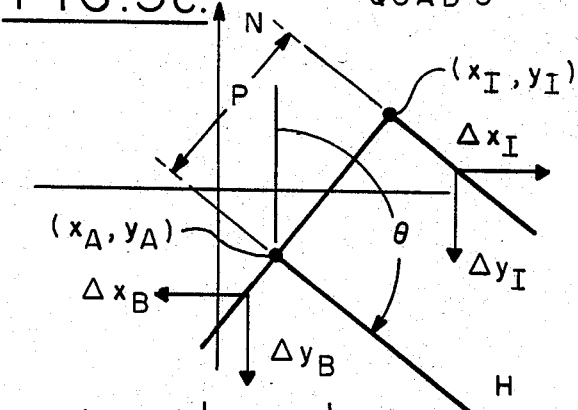

FIG. 3c.

$y_I = (x_I - x_A)|\tan\theta| + y_A$
$x_I = P\cos\theta + x_A$
$\Delta y_I = -\Delta R|\cos\theta|; \Delta x_I = \Delta R|\sin\theta|$
$\Delta y_B = -\Delta P|\sin\theta|; \Delta x_B = -\Delta P|\cos\theta|$

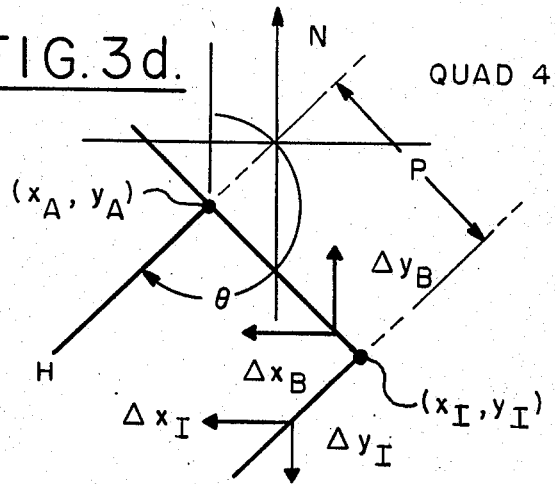

FIG. 3d.

$y_I = -(x_I - x_A)\tan\theta + y_A$
$x_I = P|\cos\theta| + x_A$
$\Delta y_I = -\Delta R|\cos\theta|; \Delta x_I = -\Delta R|\sin\theta|$
$\Delta y_B = \Delta P|\sin\theta|; \Delta x_B = -\Delta P|\cos\theta|$

SCAN CONVERTER

BACKGROUND OF THE INVENTION

1. Field of the Invention

The invention pertains to scan converters and more particularly to scan converters that store airborne radar data north up in an X, Y coordinate system and display this data in an aircraft heading up X, Y coordinate system.

2. Description of the Prior Art

Airborne radar systems, such as that utilized for weather detection have a nose mounted antenna that scan symmetrically about the longitudinal axis of the aircraft. Detected radar returns received in a $\rho$-$\theta$ coordinate system are generally displayed in a X, Y raster, similar to that of a T.V. system. Conventional scan converters for these systems convert the $\rho$-$\theta$ antenna coordinates to store the data in an arranged X-Y coodinate memory. This memory is subsequently readout in synchronism with the raster scan and displayed in X, Y format. The memory has rows and columns with each row and each column representative of X and Y coordinates respectively. In the prior art data is stored in the memory in a heading up mode, for example, north up when the aircraft is heading north, east up when the aircraft is heading east. At each X, Y intersection, a word of memory is stored which is acessed by X, Y address codes. Typically, the memory contains one full antenna scan of information in X, Y coordinates which remains stationary and are displayed numerous times during one antenna scan. In order to provide a heading up display after a turn the entire memory must be rotated to coincide with the new aircraft heading, a task that requires appreciable processing. When the aircraft turns each antenna scan provides the displaced information relative to the proceeding scan and the displayed information jumps each time the memory is updated by an antenna scan. It is desirable to rotate the information in the memory in synchronism with the turning aircraft to provide a continuously moving display, with a minimum of processing time. This may be accomplished by rotating all of the information stored in the memory prior to each raster frame. The large amount of data stored, however, requires inordinate processing times to perform the transformations, thus such systems are extremely complex and expensive.

SUMMARY OF THE INVENTION

In accordance with the principles of the present invention data received reference to a moving coordinate system is stored in a raster memory of fixed orientation. The incoming data is stored in the memory transformed from the orientation of the moving coordinate system at the time the data is received and not moved thereafter. Data is read out of the memory to provide a display in a desired format with a selected fixed orientation.

In a preferred embodiment incoming radial data in $\rho$-$\theta$ coordinates is transformed to X, Y coordinates referenced north-up in accordance with the aircraft heading at the time the data is received and entered into a memory. The memory is sufficiently large to contain a full radar antenna scan about any off aircraft heading angle, and may be considered infinite since the counters that generate the memory addresses for the storage locations roll over upon reaching a maximum count at the memory boundry. An aircraft heading-up or track-up display may then be provided by addressing the memory along lines that are parallel to the aircraft heading to track vector, extracting the data along these lines from the memory, and coupling such data to an appropriately synchronized X, Y display unit.

BRIEF DESCRIPTION OF THE DRAWINGS

FIG. 3 and FIGS. 3A-3D are useful for explaining the memory addressing procedure.

DESCRIPTION OF THE PREFERRED EMBODIMENT

The scan converter of the present invention converts data obtained in a $\rho$-$\theta$ coordinate system, as for example from a scanning antenna, to data in a X, Y coordinate system and stores this data in a memory matrix having rows and columns corresponding to the x and y coordinates. Though this data is stored in a preferred embodiment with north-up, i.e. north direction coinciding with the y axis, it should be recognized that the data may be stored in the X, Y coordinate system with any desired geographical direction up, as for example, east-up. This data is fixed in the memory and any necessary rotations, as for example, rotations necessitated by a change of direction of the carrier vehicle, is accomplished by reading the memory, in synchronism with the raster scan, along lines in the X-Y plane that are parallel to a selected reference vector, as for example the track vector or the heading vector of the vehicle.

Figure 1:
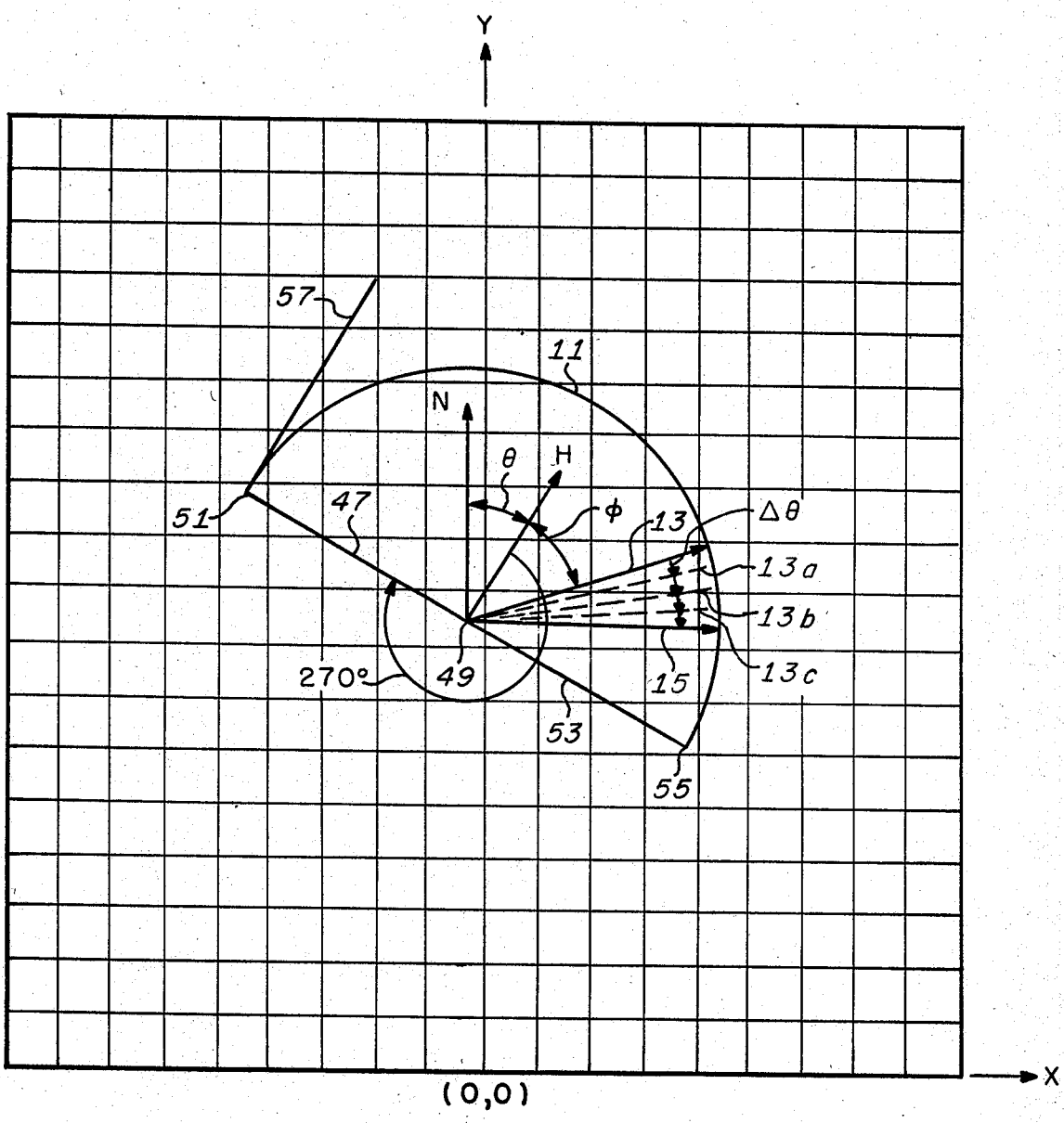
FIG. 1 is an overlay of the aircraft coordinate system on a memory grid.

Refer now to FIG. 1 wherein a data entry area bounded by the semicircle 11 is overlayed on an X, Y grid that is representative of the X, Y memory matrix of the system. In the diagram the vehicle heading vector H is shown at an angle $\theta$ from the north-vector, while a data radial 13, along which data is to be entered to a maximum range determined by the semicircle 11, is at an angle $\phi$ from the heading vector. The polar coordinates of each data cell along the data radial are converted to X, Y coordinates in accordance with the well known transformation equations $$x - x_A = r \sin(\theta + 0)$$

$$y - y_A = r \cos(\theta + 0)$$

where r is the radial distance to the data point, ($x_A$, $y_A$) is the position of the carrier vehicle, and $\phi$ is the scan angle. At the initial data entry the vehicle is considered positioned at the origin (O,O) and incremented therefrom in accordance with its movement for subsequent data entries. After each data bin entry the radial distance thereof is incremented by a predetermined constant $\Delta R$ and the x and y coordinates are incremented by $\Delta R \sin(\theta + \phi)$ and $\Delta R \cos(\theta + \phi)$ respectively, thereby entering each data bin in X, Y coordinates along the data radial. Since the data is generally derived from the scanning antenna the data resolution is limited to the antenna beam width, consequently new data is entered along the radial 15 at an angular displacement from radial 13, substantially equal to one antenna beam width. To fill in pixels between these two radials the data along the radial 13 is entered three additional times along the radials 13a, 13b, and 13c with an angular intervals θ therebetween that are substantially equal to one quarter of an antenna beam width.

Figure 2:
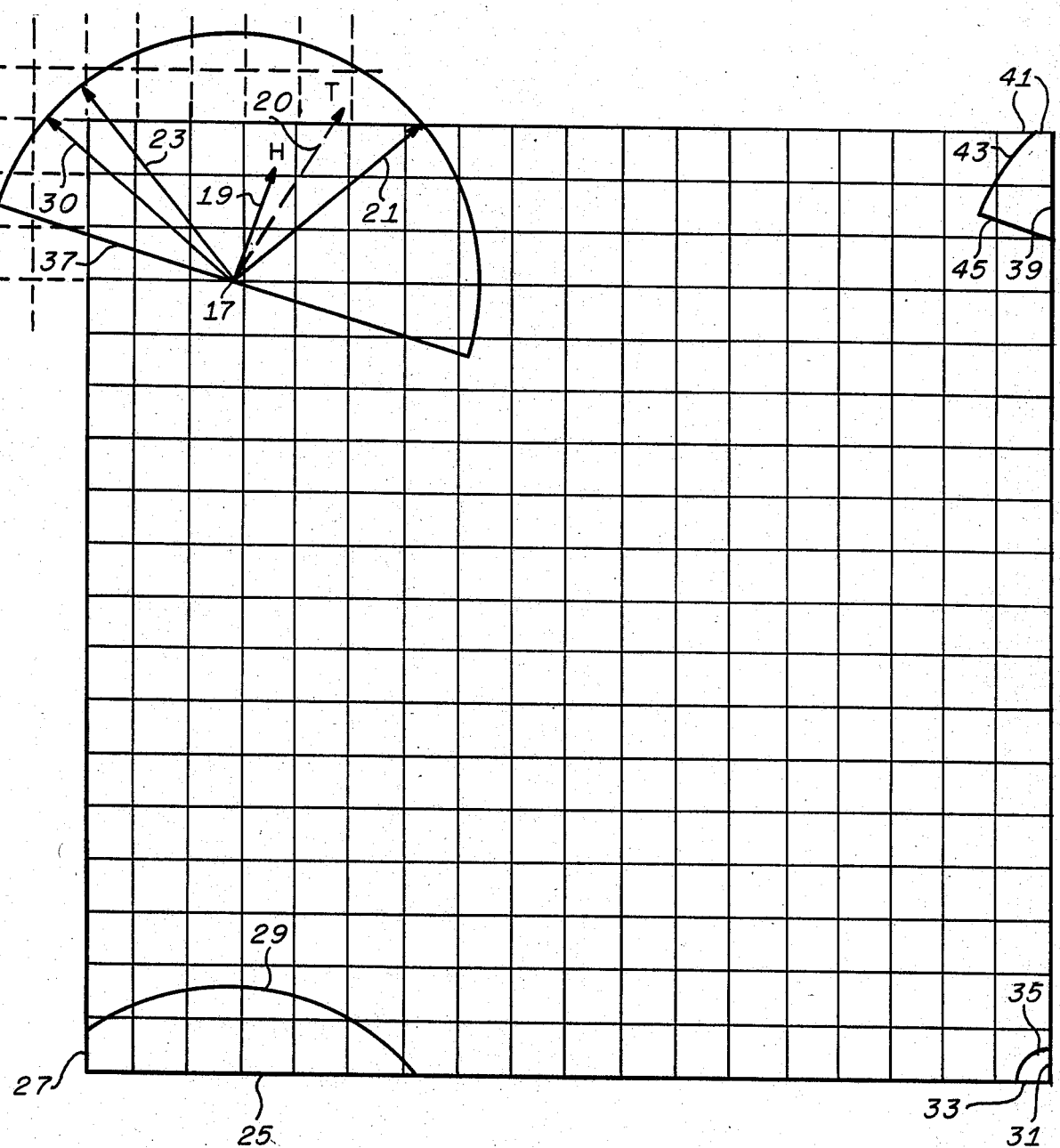
FIG. 2 is a memory grid representation, with heading vector and radial data lines overlayed thereon, that is useful in explaining the data entry system employed with the invention.

In the preferred embodiment a raster memory is employed that is four times the size of the raster display. Consequently, the data gathered by a complete antenna scan may be contiguously entered in the memory for almost all vehicle positions. The incoming radial data is entered into the memory with respect to the vehicle's present origin and heading. As the vehicle moves the origin and heading position in the memory simply changes accordingly. Thus, as shown in FIG. 2, a position 17 and heading 19 may be achieved in the memory whereat portions of the data extend beyond the boundry of the memory. This data is not lost, for the counters that generate the row and column addresses simply roll over upon reaching a maximum count. In this manner the data that extends beyond the memory boundry between radial 21 and radial 23 is stored in memory cells in the region defined by the memory boundry 25, the memory boundry 27, and the arc 29, shown in the lower left hand corner of the memory grid of FIG. 2. Similarly, data that extends beyond the memory boundry between radial 23 and radial 30 is stored in memory cells in the region defined by memory boundry 31, memory boundry 33, and arc 35, while overflow data between the radial 30 and the base line 37 is stored in memory cells in the region defined by memory boundry 39, memory boundry 41, arc 43 and straight line 45. These regions are respectively shown in the lower and upper right hand corners of the grid in FIG. 2. Since the raster memory is appreciably larger than the raster display this re-entering of the memory does not alter current data for display. Thus, the roll over of the memory address counters creates what may be considered an infinite memory.

At the conclusion of a data entry period, as for example a complete antenna scan, a radial of zero data is written along the base line 47, shown in FIG. 1, that is 270 degrees from the heading vector. These zero entries entend from the vehicle position 49 to the intersection 51 with the data boundry 11. At the conclusion of the subsequent data entry period a radial with zero data is entered along the base line 53, shown in FIG. 1, 90 degrees from the heading vector from the aircraft position 49 to the intersection 55 with the data boundry 11. Thus a zero radial is entered after each data period alternating between 90 degrees left of the heading and 90 degrees right of the heading. In this manner data is erased from the memory as it falls off the display behind the moving vehicle.

During the data display period data is read from the memory along lines perpendicular to the base lines 47, 53 in FIG. 1. Each data readout line has an origin on this base line and extends therefrom for a distance substantially equal to the length of the radial data lines 13, 15. Referring again to FIG. 1, the origin of the first raster line may be determined by adding 270 degrees to the heading vector to define the base line $$y - y_A = (x_A - x) \tan \theta$$

and a predetermined number of line increment advances are made along this base line to point 51, thereby establishing a base line of length P between the aircraft position 49 and point 51. The coordinates of $(x_L, y_L)$ of the point 51 are determined from the vehicle position 49 coordinates $(x_A, y_A)$ and the heading angle $\theta$ of the aircraft in accordance with $$x_I = x_A - P \cos \theta$$

$$y_I = (x_A - x_I) \tan \theta + y_A$$

The data read line 57 extending from the point 51 and perpendicular to the base 53 is parallel to the heading vector of the vehicle. To read data along this line the x and y increments must be consistant with the slope of the heading vector. Thus, a predetermined value ΔR is chosen for the radial increment and the x and y increments Δx and Δy are calculated therefrom and the heading angle θ of the vehicle in accordance with Δx=ΔR sin θ, Δy=ΔR cos θ. After the data has been read at point 51 the x and y postions thereof are incremented by $\Delta x_I$ and $\Delta y_I$ to a new data position whereat the data is read and the position once again incremented by $\Delta x_I$ and $\Delta y_I$ to a third memory position. This process continues until all the memory positions along the line 57 are read, whereafter an increment ΔP of predetermined length is added to the base line and corresponding $\Delta x_I$ and $\Delta y_I$ increments $\Delta x_B$ and $\Delta y_B$ are computed from this predetermined length and the slope of the base line determined for the vehicles heading direction. The new coordinates $(x_I + \Delta x_B, y_I + \Delta y_B)$ determine the origin of the next raster line which is made parallel to the initial raster line by applying the previously determined raster line increments to each coordinate position along the line. This process continues until the display is completed, whereafter a new base line and new x and y increments are determined in accordance with the heading vector of the vehicle to provide the next frame of the heading-up display.

The heading vector of an aircraft in general does not coincide with the ground track vector, as illustrated by the heading vector 19 and ground track vector 20 in FIG. 2. It should be apparent that a track-up display may be obtained as described above by substituting the aircraft track vector for the heading vector.

Since coordinate positions along the base line and the raster line are determined by the arithmetic operations of addition, substraction, and multiplication it is necessary for the coordinate fractions (increments) to carry the proper arithmetic signs. These signs are determined by the slopes of the base line and the raster line, which in turn are functions of the vehicle heading angle. The four quadrants of possible heading direction are shown in FIG. 3 while the equations for determining the initial raster line coordinates, raster line coordinate fractions, and base line coordinate fractions for each quadrant are shown in FIGS. 3A through 3D. When the vehicle is heading substantially north or south the coordinate fractions $\Delta y_B$ and $\Delta x_I$ are set at zero and the coordinate fractions $\Delta y_I$ and $\Delta x_B$ are assigned appropriately signed constant lengths and when the vehicle is heading substantially east or west the coordinate fractions $\Delta y_I$ and $\Delta x_B$ are set at zero while the coordinate fractions $\Delta y_B$ and $\Delta x_I$ are assigned appropriately signed constant lengths.

Figure 4:
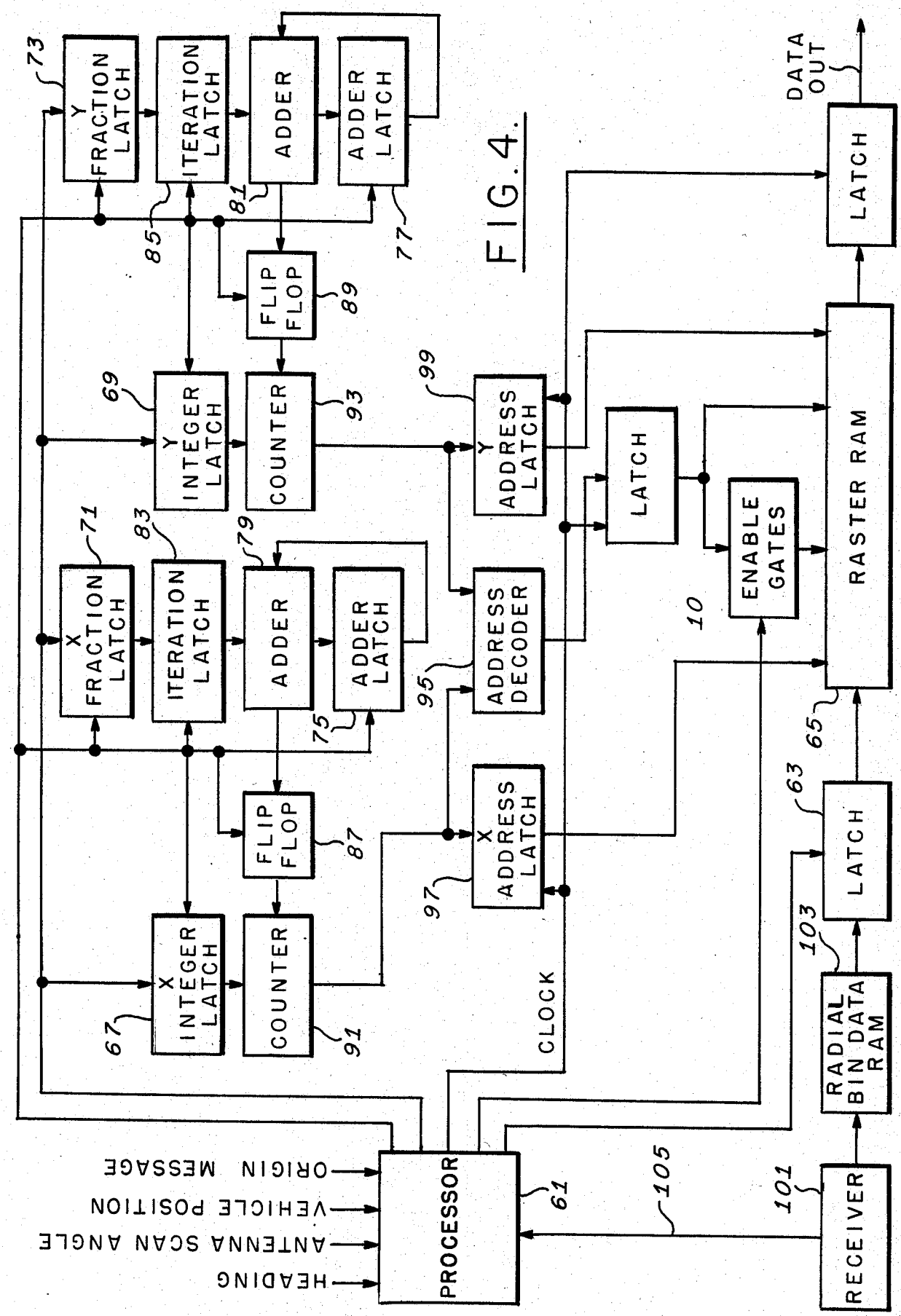
FIG. 4 is a block diagram of an address generator that may be used in the invention for addressing the rows and columns of the memory.

A system employing the invention may possess a raster/stroke display cycle that allots equal time to the raster stroke functions. Referring to FIG. 4 a processor 61 receives heading, vehicle position, and antenna scan angle information from other systems on the vehicle. At the beginning of each stroke period an origin message is received from a control unit, not shown, commanding the processor to compute the base line and coordinate fractions for the vehicle's position and heading vector. With this task completed the processor 61 perturbates the x and y-fractions in accordance with the antenna scan angle and a constant increment along the radial for the present radial, and enters the radial data from a latch 63 into a raster RAM 65. To generate the address for the entry of this data the vehicle coordinates ($x_A$, $y_A$) are respectively entered into the x and y integer latches 67, 69 and the coordinate fractions $\Delta x_S$ and $\Delta y_S$ are respectively entered into the x and y fraction latches 71 and 73, these determine the slope of the line in (x, y) coordinates along which the data is entered. Each time the adder latches 75, 77 are clocked the accumulated fractions are added in adders 79, 81 to the iteration fraction from iteration latches 83, 85. The integer overflow from the adders 79, 81 are accumulated, via flip-flops 87, 89 by the counters 91, 93 to form x and y addresses. A preselected number of most significant bits from the x and y address generators may be coupled to decoder 95 and decoded therein to select one of a predetermined number of raster RAMs in each page of memory, while the remaining bits consitute the row and column address of the selected RAM and are coupled to the raster RAM via latches 97, 99.

Range bin information from a receiver 101 is clocked in to a radial bin data RAM 103 and therefrom to latch 63 for entry into the raster RAM 65. With each range bin increment a signal is sent to processor 61 via line 105 wherefrom a clock pulse and an enable signal are coupled to latch 63 and enable gates 107 respectively for entry of the range bin data.

At the completion of the stroke cycle, the first raster line and the x, y increments there along, that are calculated from the heading vector and vehicle position as previously described, are entered into the integer latches 67, 69 and iteration latches 83, 85 respectively, to establish addresses for reading the raster RAM 65. The coordinate fractions $\Delta x_I$, $\Delta y_I$ are chosen to provide raster lines that are parallel to the heading vector. These coordinate fractions remain constant for all raster lines within a displayed frame. As previously discussed, each time the adder latches 75, 77 are clocked the accumulated fractions therein are added to the iteration fraction from the iteration latches 83, 85 and the overflow from adders 79, 81 are coupled via flip-flops 87, 89 to the counters 91, 93. This process continues until all the data along a raster line has been read from the memory. Thereafter the x and y integers in latches 67, 69 are altered by $\Delta x_B$ and $\Delta y_B$ respectively to define the origin, along the previously determined base line, of the next raster line. The process of adding the iteration fraction to the accumulated sum and coupling the over flow of the adders 79, 81 to the counters 91, 93 is repeated until the second raster line is completed. This process of incrementing the origin of a raster line along the base line for the heading vector angle and incrementing the x and y address codes by the coordinate fractions $\Delta x_I$, $\Delta y_I$, continues until the display frame is completed.

The address generators for the x and y coordinates operate in a similar manner. Consider the x coordinate address generator. An integer number, representative of the x coordinate of the raster line on the base line, is stored in the integer latch 67 and an incrementing fractional number is stored in the fraction latch 71 and transferred to the iteration latch 83. When the components of the address generator are clocked, the number in the iteration latch is applied to the adder 79, the output of the adder 79 is applied to the adder latch 75 and coupled back to the adder 79 wherefrom the overflow is coupled to the flip-flop 87. Thus, the number in the adder 79 will increase and the over flow rate therefrom is in direct proportion to the magnitude of the number stored in the iteration latch 83. If a zero is stored in the iteration latch 83, the contents of the adder 79 will always be zero and the counter 91 will never be incremented by an over flow from the adder 79. If all "1's" are stored in the iteration latch the adder 79 will overflow with each clock pulse and the count in the counter 91 will rapidly increase. A number half way between will cause the counter to increase at an intermediate rate. Thus, depending upon the number stored in the iteration latch 83, the incrementing rate of the counter 91 may be controlled.

Consider a vehicle heading north. Since all raster lines are parallel to the vehicles heading vector, each will traverse a single column in the raster memory 65. This may be accomplished by storing a zero in the x iteration latch 83 and a number corresponding to the raster line memory for display in the x integer latch 67, and a number corresponding to the desired y increment along the raster line in the y fraction latch 73 and a number corresponding to the base line position, which is of constant y value, in the y integer latch 69. Such initial storage establishes a constant column address and an increasing row address for the raster line read out. The number of y increments in each raster line is chosen to provide a raster line from the bottom of the display screen to the top thereof. After the fly back to the bottom of the screen for the next raster line occurs, the x integer in the x integer latch 67 is incremented by $\Delta x_B$ and the next raster line is initiated. If the vehicle is heading due east the roles of the x and y coordinate address generators are interchanged and a zero is stored in the y fraction latch 73 and an integer representative of the x coordinate increment is stored in the x integer latch 67. If the heading vector of the vehicle is 45 degrees equal integers are stored in the x and y integer latches 67, 73 to establish equal column and row increments in the address generator, thereby accessing data in the raster RAM 65 along a 45 degrees line.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A method for presenting data from a sensor on a vehicle moving along vector tracks comprising the steps of:

receiving data in coordinates of a first coordinate system;

converting data coordinates in said first coordinate system to data coordinates in a second coordinate system;

storing converted data in a memory having data storage locations arranged to represent said second coordinate system;

entering initial position coordinates of said vehicle in said second coordiante system in an initial position coordinate memory;

entering coordinate incremental fractions for said second coordinate system in incremental fraction memories, said incremental fractions selected to establish lines originating at said vehicle position along which data is stored in said memory;

adding said coordinate fractions in an accumulating manner to said initial position after a data entry at a data coordinate to establish a subsequent data coordinate for data entry;

addressing said memory to read out data along parallels to said vector tracks in said second coordinate system; and displaying said read out data along parallels to said vector tracks on a display whereon said vector tracks have a common predetermined orientation.

2. A method for presenting data in accordance with claim 1 wherein the step of addressing said memory includes:

establishing a base line, in said second coordinate system, through said vehicle initial position coordinates perpendicular to said vehicle track;

establishing origin coordinates on said base line, in said second coordinate system, a predetermined distance from said vehicle initial coordinates position whereat an initial raster line originates;

entering said origin coordinates in said initial coordinate memory entering coordinate fractions, selected to establish raster lines parallel to said vehicle track, in said coordinate fraction memory;

adding said coordinate fractions to said initial position coordinates to establish address codes to said memory;

incrementing said origin position coordinates of said initial raster line to establish origin position coordinates on said base line for subsequent raster lines; and adding said coordinate fractions to said origin coordinates of said subsequent raster lines to provide address codes to said memory along lines in said second coordinate system that are parallel to a data line corresponding to said initial raster line.

3. A method in accordance with claim 1 wherein said first coordinate system is a polar coordinate system and said second coordinate system is a rectangular coordinate system.

4. A method in accordance with claim 3 wherein said display is in an X-Y coordinate system having x and y axes and said vectored track presentation is a line perpendicular to said x-axis of said display, thereby establishing a track-up display.

5. A method for displaying data in accordance with claim 1 wherein said addressing step includes addressing said memory with counters that rollover upon reaching a maximum count, and a boundary of said memory, to address said memory commencing with a first memory stage.

6. A method for displaying data in accordance with claim 2 wherein said storing step includes entering zero data along said baseline from initial position coordinates memory cells to a first data boundary at a conclusion of a first data entry period, and entering zero data along said baseline from said initial position coordinate memory cells to a second data boundary, at coordinates diametrically opposite said first data boundary, at a conclusion of a second data entry period next following said first data entry period.

7. An apparatus for generating an address for a memory comprising:

integer storage means for storing coded signals representative of coordinates of selected initial positions in a predetermined coordinate system;

position coordinates means coupled to said integer storage means for providing coded signals representative of position coordinates in said predetermined coordinate system;

coordinate fraction means for storing coded signals representative of coordinate fractions selected to establish lines having chosen slopes in said predetermined coordinate system;

means coupled to said coordinate fraction means and said position coordinate means for adding said coordinate fraction representative coded signals and providing accumulated coordinate fraction representative signals to said position coordinate means for addition to said initial position coded signals to establish position coordinate coded signals; and means for coupling said position coordinate coded signals to a memory for addressing said memory.

8. An apparatus for generating a memory address in accordance with claim 7 wherein said predetermined coordinate system is a rectangular coordinate system.

9. An apparatus for generating an address for a memory in accordance with claim 7 wherein said position coordinate means include counters which rollover upon reaching a maximum count, and a boundary of said memory, to address said memory commencing with a first memory stage.

* * * * *